United States Patent [11] 3,569,807

| [72] | Inventor | Thomas J. Ulrich |
| | | Binghamton, N.Y. |
| [21] | Appl. No. | 802,792 |
| [22] | Filed | Feb. 27, 1969 |
| [45] | Patented | Mar. 9, 1971 |
| [73] | Assignee | National Electro-Mechanical Systems, Inc. |
| | | Binghamton, N.Y. |

[54] MOTOR SPEED CONTROL SYSTEM
5 Claims, 3 Drawing Figs.
[52] U.S. Cl. .................................................. 318/308,
318/332, 318/341, 318/434
[51] Int. Cl. ............................................. H02k 23/08,
H02p 5/06
[50] Field of Search ........................................... 318/331,
332, 341, 434, 308, 346

[56] References Cited
UNITED STATES PATENTS
| 2,782,356 | 2/1957 | Mannheimer | 318/346X |
| 3,427,506 | 2/1969 | Thiele | 318/341X |
| 3,437,826 | 4/1969 | Kelley | 318/341X |

Primary Examiner—Oris L. Rader
Assistant Examiner—Robert J. Hickey
Attorney—John W. Young ABSTRACT: This disclosure described a motor speed control system for a direct current series field motor. The direct current series field motor is driven by a drive circuit that is current limited and actuated by a current-limiting voltage-sensing circuit; the direct current motor, the drive circuit, and the current-limiting and voltage-sensing circuit operates as a relaxation-type oscillator, aperiodically pulsing the direct current motor, switching the motor on and off at varying rates and ratios, to provide smooth, quiet and efficient motor operation.

3,569,807

THOMAS J. ULRICH
INVENTOR

BY John W Young
ATTORNEY

MOTOR SPEED CONTROL SYSTEM

The present invention relates to a direct current series motor speed control system, and, more particularly, to a direct current series motor control speed system which is current limiting and wherein the direct current series motor is an integral component of the control system.

Present-day direct current series motors used in propelling small vehicles, such as golf carts, forklifts, etc., require very high current levels, and the control systems presently known and used usually suffer sharp transitions from very high current levels to low current levels, resulting in nonlinear speeds of the vehicle, excessive contact wear of the switching mechanism, and a short battery life. It is therefore desireable to regulate or modulate the voltage and/or the current to the direct current series motor to match the various requirements of torque, speed, load, etc. To obtain smooth, quiet and efficient operation for any voltage and/or current level, the motor speed is primarily determined by the torque requirements, i.e., the speed characteristics of the motor and vehicle combination.

Conventionally, motor speed control is obtained by inserting an impedance in series with the field winding of the motor to decrease the applied voltage, as required. This method is extremely inefficient due to the extreme power losses when operating at high current and torque levels.

A more efficient way of providing smooth, quiet and electrically efficient motor speed control is the use of a current limited relaxation-type oscillator to drive the direct current motor at operational torque load and speed conditions.

In the preferred embodiment of the present invention, the direct current series motor is driven by a drive circuit with a capacity of several hundred amperes, well below the maximum current level of the direct current motor; the output of the drive circuit is directed to the field winding and armature of the direct current motor to provide drive to the vehicle. A current-limiting and voltage-sensing circuit monitors the current level applied to the motor by the drive circuit and when a predetermined current level is reached, the drive circuit is turned off, effectively disconnecting the motor from the drive circuit.

The direct current motor, due to inertia, continues to rotate or drive, generating an internal voltage and the applied voltage to the motor dissipates. A further sensing unit, to sense the magnitude of the generated voltage is provided, and operates in conjunction with the drive circuit and the current limiting and voltage sensing circuit to maintain the drive circuit inoperative, preventing oscillation and hunting, until the current level generated by the motor dissipates. The cycle then repeats itself, the drive circuit applying a voltage level to the motor, driving the motor at a greater rate. At the time that the current level of the signal applied to the direct current motor again reaches the predetermined operating current level, the drive circuit is again turned off, removing the applied signal from the motor. Again the motor continues to rotate or drive, and the back e.m.f. detector circuit operates to maintain the drive circuit inoperative.

The drive circuit, the direct current series motor, the current-limiting and voltage-sensing unit, and the back detector unit, basically comprise a relaxation-type oscillator, the direct current motor being an integral and indispensible part, to provide aperiodic pulsing of the motor for smooth, quiet and efficient operation.

Additionally, and this is another important feature of the present invention, due to the very high current levels at which the direct current series motor operates, protection and overload circuits are provided, interacting with the drive circuit, the current-limiting and voltage-sensing unit and the direct current series motor, to assure safe and efficient operation; the protective circuit and their functions, will be more particularly described hereinafter.

It is an object of the present invention to provide a direct current series motor control system to provide smooth, quiet, and efficient operation of an electrical vehicle, such as a forklift, golf cart and the like.

It is a further object of the present invention to provide a current limited direct current series motor speed control system to provide smooth, linear, quiet, and efficient operation at operational torque levels.

It is a further object of the invention to provide a direct current series motor speed control system wherein the motor is an integral part of a relaxation-type oscillator drive unit.

With the foregoing in mind, other and further objects and features of the present invention are shown and described in the preferred embodiment and will become evident as the specification proceeds, and the invention will be understood from the following description taken in conjunction with the accompanying drawings, where:

Low-voltage high-current direct current series motors are now commonly used to propel electrical vehicles such as forklifts, golf carts and the like; and, when a direct current series motor is used as the traction motor for such devices it becomes essential for smooth, quiet and efficient operation, to control the voltage and/or current to the direct current motor to match the various and changing torque requirements of grades, speeds, loads, etc.

Figure 1:
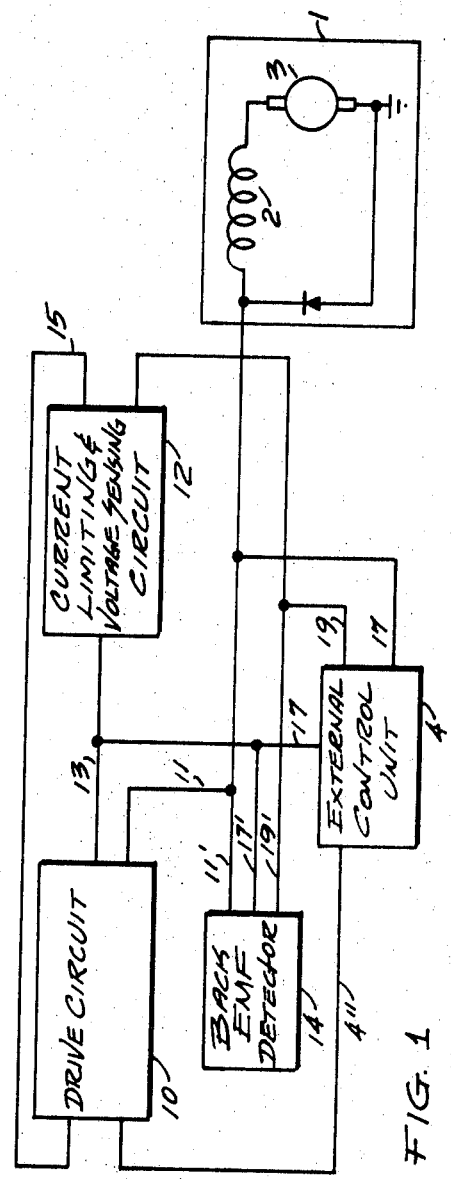
FIG. 1 is a block diagram of the preferred embodiment of the present invention.
Figure 2:
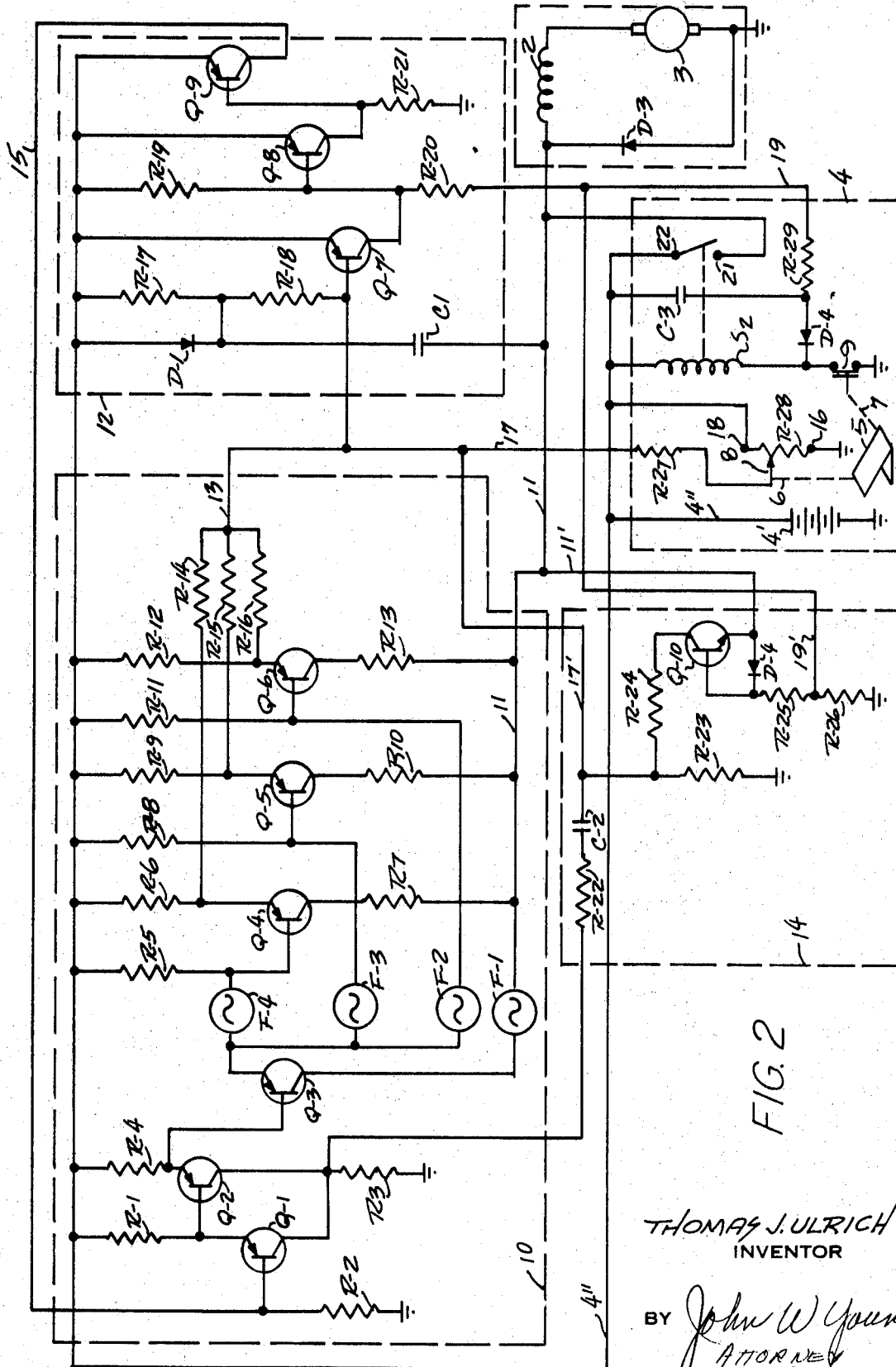
FIG. 2 is an electrical schematic of the preferred embodiment of the direct current series motor speed control system.

Referring now to FIGS. 1 and 2, wherein the preferred embodiment of the invention is shown and illustrated, the vehicle, now shown, is driven by a direct current series motor unit 1, comprising a field winding 2 and an armature 3 connected in series. Also included in said vehicle is an external control unit 4 which includes an accelerator pedal 5, as shown in FIG. 2, which is mechanically linked, by linkages 6 and 7 to a moveable arm 8 of a potentiometer resistor R28 and a full power switch 9.

Direct current series motor 1 is actuated by a low-voltage high-current signal from a DC battery 4' on output line 4'' of external control unit 4, the signal being directed to motor 1 from a drive circuit 10 on an output line 11. A current-limiting and voltage-sensing circuit 12 monitors the current level of the signal on output line 13 of drive circuit 10 and when the current level of the signal on output line 13 reaches and/or exceeds a predetermined current level current-limiting and voltage-sensing circuit 12 directs a signal to drive circuit 10 by an output line 15 to turn drive circuit 10 off, and deenergize line 11 and motor 1.

Due to inertia, etc., motor 1 continues to drive, generating a back electromotive force. This back e.m.f. is detected by a back e.m.f. detector 14 which interacts with current limiting and voltage sensing circuit 12 and drive circuit 10 to assure that drive circuit 10 remains turned off after the predetermined current level has been reached, providing a protective function for drive circuit 10, and preventing oscillation and hunting at that level.

Referring now solely to FIG. 2, when the vehicle, not shown is at rest, potentiometer arm 8, which is mechanically controlled by accelerator pedal 5, is positioned at the terminal end 16 of potentiometer resistor R28, the accelerator pedal 5 being in its normal nonactuated rest position. Resistors R27 and R28 of external control unit 4 are connected to the base of a transistor Q7 of the current-limiting and voltage-sensing unit 12 by an output line 17, providing the base bias for transistor Q7; biasing transistor Q7 on when arm 8 is at terminal 16 of resistor R28. Thus, when the vehicle is at rest, arm 8 being at terminal 16 of resistor R28, transistor Q7 is biased on and held in a state of conduction, bringing the base conductor of transistor Q8 to the level of the emitter of transistor Q7, maintained transistor Q8 in a state of nonconduction. A further drive or switching transistor Q9 is driven by transistor Q8 and is held in a state of conduction when transistor Q8 is turned off. When transistor Q9 is conducting a positive going signal is directed from the collector of transistor Q9 on an output line 15 to drive circuit 10. The positive going signal on output line 15 inhibits or turns off drive circuit 10, as will be explained in detail hereinafter, deenergizing output 11 of drive circuit 10 and direct current series motor 1.

The function and operation of drive circuit 10 will be explained at this time to better understand the operation of the overall system. Drive circuit 10 basically comprises a saturated Darlington drive consisting of transistors Q3, Q4, Q5, and Q6, which are controlled and driven by transistors Q1 and Q2. A saturated Darlington drive is old and well known in the art and consists principally of three power transistors, Q4, Q5, and Q6, connected in parallel, which are controlled by the drive transistor Q3. It has been emphasized that one of the primary features of this invention is that a low voltage (say 36 volts) - high current (a range of from 200 to 360 amperes) is used to power the direct current series-wound motor 1. Most high current capacity transistors, such as transistors Q3, Q4, Q5 and Q6 have slow switching characteristics and the loadline excursions of these transistors are very similar; and, due to the very high operational current levels it is extremely necessary to provide protective elements in the drive circuit. For instance, it is obvious that the drive transistor Q3 will start to turn on prior to transistors Q4, Q5 or Q6, and it is possible that it will switch a load line that is beyond it its current capacity. Further the high current levels are handled by using high current rated transistors in parallel, with each of the transistors conducting a proportionate share of the current; in the instance depicted by the preferred embodiment of the invention, each transistor Q4, Q5 and Q6 will conduct one-third of the current. If an electrical malfunction should occur in any of the three parallel circuits the entire system would be in jeopardy as the current capacity levels of each remaining circuit would be exceeded.

In the present invention, matched resistors, R6, R9, and R12 are connected to the emitters of transistors Q4, Q5 and Q6 respectively, to equalize the collector current levels of each transistor Q4, Q5 and Q6. Resistors R6, R9 and R12 additionally function as a fuse or protective element as they will immediately burn out if the current capacity of that stage is exceeded. Additional protection is obtained by inserting Fuses F2, F3 and F4, between the emitter of drive transistor Q3 and the base electrodes of transistors Q4, Q5 and Q6; a fuse F1 is also inserted between the collector of drive transistor Q3 and the output line 11 as additional protection for direct current motor 1, in case of a malfunction of transistor Q3.

When output line 15 of current limiting and voltage sensing circuit 12 is positive going, i.e. at 36 volts, transistors Q1, Q2, Q3, Q4, Q5, and Q6 are all biased or turned off, maintaining output line 11 in a deenergized state. When line 15 goes negative, i.e. to ground, switching transistors Q1 and Q2, are turned on and, in turn, serially turn on drive transistor Q3.

Drive transistor Q3, in turn, actuates power transistors. Q4, Q5, and Q6, the base electrode of which, respectively, are connected to voltage source 4', and line 4'', by resistors R5, R8, and R11, directing the output signal to direct current motor 1 on output line 11.

The emitters of power transistors Q4, Q5, and Q6, are respectively connected by matched resistors R14, R15, and R16 to an output line 13 of drive circuit 10, which is directed to the current-limiting and voltage-sensing unit 12, and more particularly to the base of switching ta transistor Q7 providing the current-limiting aspect of the present invention which will be described in detail hereinafter.

Previously, the electrical configuration of the motor speed control system has been described, with the vehicle at rest and potentiometer arm 8 at terminal 16 of potentiometer resistor R28. When the vehicle is driven, accelerator pedal 5 is depressed moving arm 8 from terminal 16 of resistor R28 towards terminal 18 of resistor R28. As the arm is moved towards terminal 18 a positive going signal is transmitted on line 17 to the base electrode of switching transistor Q7, turning the transistor Q7 off, and in turn, turning transistor Q8 on and transistor Q9 off. The positive going signal on output line 15 of current-limiting and voltage-sensing unit 12 is removed and line 15, being negative, actuates switching transistor Q1, which in turn serially actuates transistors Q2, Q3, Q4, Q5, and Q6, as described hereinbefore. Drive circuit 10 is thereby activated and the 36-volt signal is directed to the direct current motor 1 by output line 11 of drive circuit 10.

Figure 3:
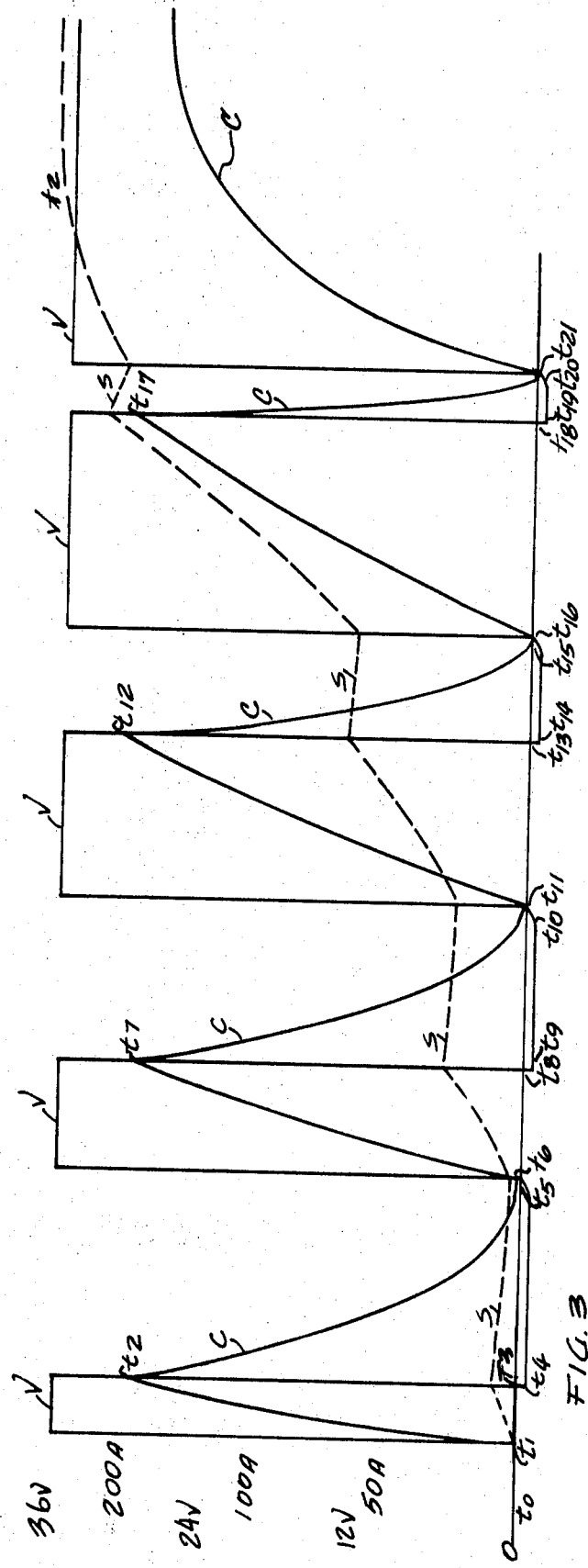
FIG. 3 is a waveform diagram of the input signal to the direct current series motor system, to aid in understanding the present invention.

Referring now to FIG. 3, the waveforms thereon depict the signal found on output line 11 of drive circuit 10. At time $t_0$ the vehicle is at rest and drive circuit 10 is deenergized, switching transistor Q7 of current-limiting and voltage-sensing circuit 12 being biased on by the positioning of potentiometer 8 by pedal 5 at terminal end 16 of resistor R28.

At time $t_1$, potentiometer arm 8 is moved along resistor R28, toward terminal end 18 of resistor R28, turning switching transistors Q7 and Q9 off, transistor Q8 being turned on; output line 15 of current-limiting and voltage-sensing circuit 12 is negative going or deenergized and drive circuit 19 10 is thereby activated by the negative going signal found on line 15. With drive circuit 10 activated the source of voltage from battery 4', i.e. 36 volts, is directed to direct current motor 1 by output line 11. Referring to FIG. 3, the voltage waveform found on line 11 is depicted by the solid line waveform $v$, the current waveform is depicted by the solid line waveform $c$, and the motor speed is represented by waveform $s$.

Series motor 1 is energized and begins to drive. The supply voltage is continually applied to direct current motor 1 until time $t_2$, the time at which the current level of the signal on line 11 reaches the predetermined current level, i.e. 200 amperes.

Referring to FIGS. 2 and 3, the current level on line 11 is determined by current-limiting and voltage-sensing circuit 12 monitoring the voltage drop across emitter resistors R6, R9, and R12, of power transistors Q4, Q5, and Q6 respectively. Thus, as the current through transistors Q4, Q5 and Q6 increases, the voltage drop across the respective emitter resistors R6, R9 and R12 increases until a predetermined level is reached on output line 13 of drive circuit 10, say 0.6 volt. At this time, $t_2$, switching transistor Q7 of the current-limiting and voltage-sensing circuit 12 is turned on, turning transistor Q8 off and transistor Q9 on. Output line 15 of current-limiting and voltage-sensing unit 12 goes positive, i.e. to 36 volts, and inhibits, or turns off, drive circuit 10.

Referring now to FIG. 2, a capacitor C2 and a resistor R22 are serially connected between the collectors of switching transistors Q1, and Q2 of drive circuit 10 and the base of switching transistor Q7 of current-limiting and voltage-sensing unit 12 by an output line 17' to prevent transistor Q7 from turning off immediately, resistor R22 and capacitor C2 providing a momentary on bias from time $t_2$ to time $t_3$ for transistor Q7 as the voltage at the collectors of transistors Q1 and Q2 is negative going at this time. Thus, capacitor C2 maintains drive circuit 10 in a deenergized state and prevents oscillation or hunting at the predetermined current level.

Direct current motor 1, once it is energized, continues to rotate or drive, generating a back e.m.f. At time $t_3$ the direct current motor back e.m.f. forward biases diode D3 of direct current motor 1 and the voltage level on output line 11 drops to a negative level, the level being determined by the characteristics of diode D3. At time $t_4$, the direct current motor back e.m.f. has reached its maximum negative level and this signal is directed to the emitter of transistor Q10 of back e.m.f. detector 14 by lines 11 and 11', turning transistor Q10 on. Transistor Q10 is additionally biased on by resistors R26 and R20, and back e.m.f. detector transistor Q10 holds switching transistor Q7 of current limiting and voltage-sensing unit 12 on, by the signal transmitted to the base of Q7 by line 17' through resistor R24, assuring that drive circuit 10 is held off during this portion of the cycle. Resistor R23 provides a small amount of turn on bias to transistor Q7 and limits the maximum current that will be detected by the current-limiting and voltage-sensing unit 12. A diode D4 is connected between the emitter and base of transistor Q10 to prevent reverse breakdown occuring from the base to emitter in the back e.m.f. detector transistor Q10.

At time $t_5$, the motor current drops below the forward bias current level of direct current motor diode D3 and at time $t_6$, the back e.m.f. current signal has dissipated entirely. At this time, $t_6$, back e.m.f. transistor Q10 turns off, the emitter of transistor Q10 going positive and the cycle recommences. At this time, $t_6$ the speed of the motor, as represented by the waveform is shown in FIG. 3 has decreased, however, motor 1 still continues to rotate.

At time $t_6$, switching transistors Q7 and Q9 of current limiting and voltage sensing unit 12 are turned off, again removing the positive going inhibiting signal from line 15 to activate drive circuit 10 and apply the voltage signal, i.e. 36 volts to motor 1 by line 11. This signal is continually applied to direct current motor 1 driving it at a greater rate until time $t_7$, the time at which the current level again reaches 200 amperes. At this time, $t_7$, transistor Q7 of current-limiting and voltage-sensing unit 12 is again turned on and is held on by the back e.m.f. detector 14, as described hereinbefore. It is noted that the time interval from time $t_6$ to time $t_7$ is longer than the time interval from $t_1$ to $t_2$ as direct current motor 1 continues to drive, and as the motor speed increases its generated voltage, which also increases internally, subtracts from the supply voltage, requiring a longer period for the system to reach a predetermined current level.

At time $t_8$ the back e.m.f. of motor 1 forward biases diode D3 and switching transistor Q7 is held on by the negative going signal from resistor R22 and capacitor C2 of the back e.m.f. detector unit 14. At time $t_9$, transistor Q10 of back e.m.f. detector unit 14 is again turned on, holding transistors Q7 and Q9 of current limiting and voltage sensing unit 12 on.

At time $t_{10}$, the back e.m.f. of motor 1 begins to dissipate and at time $t_{10}$, the cycle again repeats itself, the back e.m.f. being dissipated. It is noted that the time interval from time $t_2$ to $t_6$ is much longer than the time interval from $t_7$ to $t11$ as the generated voltage and speed of motor 1 are increasing, as shown in FIG. 3; that is, the drive current required to drive the motor at a particular speed under constant torque requirements is proportional to the difference between the voltages applied and the generated voltage, and as the incremental voltage difference between the applied voltage and the generated voltage decreases, the concomitant rate of change of the drive u current will also decrease.

At time $t_{11}$, the switching transistor transistors Q7 and Q9 of voltage-sensing unit 12 are again turned off and drive circuit 10 activated. The signal on line 11 is again applied to direct current series motor 1 until time $t_{12}$ when the current level again approaches the predetermined level. Again at $t_{12}$, switching transistors Q7 and Q9 are maintained in a state of conduction, deenergizing drive circuit 10 and line 11. Back e.m.f. detector unit 12 maintains drive circuit 10 in a deenergized state until time $t_{16}$ when the cycle again repeats itself. The speed of the motor 1, as depicted by waveform s continues to increase, resulting in a greater generated voltage within motor 1. Because of the increased internal voltage, the time required for the applied current to reach the predetermined level, time $t_{17}$ is increased. At the time, time $t_{17}$, transistors Q7 and Q9 of the current limiting and voltage sensing unit 12 are again turned on, deenergizing drive circuit 10. Again the back e.m.f. detector unit 14 maintains drive circuit 10 in a deenergized state until time $t_{21}$, at which time the cycle repeats itself.

Again the drive circuit 10 is reenergized and the applied signal directed to the motor by output line 11. The current applied to the motor, however, increases the speed of the motor, and the generated internal voltage of the motor also c increases. At time $t_{22}$ motor 1 develops its maximum speed under the particular torque conditions, and drives continuously. At this time, the difference voltage between the voltage applied and the generated voltage has decreased to a point wherein the applied current fails to reach the predetermined level and the voltage source is continually applied to direct current motor 1 through drive circuit 10.

There is also provided in external control unit 4 a full power switch 9 and a solenoid, comprising coil S2 and contacts 21 and 22, contacts 21 and 22 are mechanically actuated by the armature, not shown, of the solenoid. When accelerator pedal 5 is fully depressed, contact 9 is closed energizing coil S2 and closing contacts 21 and 22, directing 36 volts directly to the motor. This feature of course is used only when maximum torque requirements are presented.

Thus, by devising a motor speed control system wherein the direct current series-wound motor is an integral part of a relaxation-type oscillator motor speed control system, smooth, linear, l quiet, and efficient operation is obtained. It will also be understood that various and other changes and details of the invention which has been described and illustrated above may be made by those skilled in the art within the principal and scope of the invention as expressed in the appended claims;

I claim:

1. A direct current motor control system, comprising:
   a. A series-wound direct current motor including a field winding and an armature having a pair of terminals.
      1. One terminal of said armature being connected to said field winding and the second terminal of said armature being connected to ground;
   b. a diode connected in parallel with said field winding and said armature;
   c. an external control unit, including a direct current voltage source of constant amplitude and means for varying the magnitude of said voltage source;
   d. a drive circuit directly connected to said voltage source of said external control unit and to said field winding of said direct current motor to aperiodically provide a constant amplitude voltage signal thereto;
   e. a current-limiting and voltage-sensing circuit connected to said drive circuit and said voltage source of said external control unit, said current-limiting and voltage-sensing circuit being responsive to said means for varying the magnitude of said voltage source of said external control unit to activate said drive circuit to apply said constant amplitude voltage signal to said motor and responsive to said drive circuit to deactivate said drive circuit and remove said signal from said motor when the current level of said constant amplitude signal to said motor reaches a predetermined level; and
   f. a back electromotive force detector connected to said current-limiting and voltage-sensing circuit, said drive circuit and said field winding and diode, said back electromotive force detector, being responsive to the generated voltage of said motor to provide a back e.m.f. signal to maintain said current-limiting and voltage-sensing circuit in the state wherein said drive circuit is deactivated until such time as said generated voltage of said motor dissipates to a predetermined level whereby said current-limiting and voltage-sensing circuit becomes operative to reactivate said drive circuit to reapply said constant amplitude signal to said motor until said current level of said constant amplitude signal again reaches said predetermined level.

2. A device according to claim 1 wherein said means for varying the magnitude of said voltage source comprises a mechanical means and a potentiometer for a varying the bias voltage applied to said current-limiting and voltage-sensing circuit.

3. A device according to claim 1 wherein said drive circuit comprises a saturated Darlington drive consisting of at least two power transistors in parallel.

4. A device according to claim 3 wherein said current-limiting and voltage-sensing circuit is responsive to said means for varying the magnitude of said voltage source to direct an energizing signal to said drive circuit to apply said voltage source to said motor and responsive to the current level of said signal applied to said motor by said drive circuit to deenergize said drive circuit.

5. A device according to claim 1 wherein said back electromotive force detector comprises a transistor having a base electrode, a collector electrode and an emitter electrode, said emitter electrode being connected to said drive circuit and said fieldwinding, said collector electrode being connected to said current-limiting and voltage-sensing circuit and said drive circuit, and said base electrode being connected to said emitter electrode by a diode, whereby said back electromotive force detector is effective to maintain said current-limiting and voltage-sensing circuit and said drive circuit in such condition to remove said constant amplitude signal from said motor until the generated voltage of said motor dissipates to a predetermined level.